(12) United States Patent
Bernheim et al.

(10) Patent No.: US 6,611,807 B1
(45) Date of Patent: Aug. 26, 2003

(54) ECONOMIC SECURITY PLANNING METHOD AND SYSTEM

(75) Inventors: B. Douglas Bernheim, Stanford, CA (US); Jagadeesh Gokhale, Solon, OH (US); Laurence J. Kotlikoff, Lexington, MA (US); Lowell A. Williams, Nashua, NH (US)

(73) Assignee: Economic Security Planning, Inc., Stanford, CA (US)

( * ) Notice: Subject to any disclaimer, the term of this patent is extended or adjusted under 35 U.S.C. 154(b) by 0 days.

(21) Appl. No.: 09/268,441

(22) Filed: Mar. 12, 1999

Related U.S. Application Data

(60) Provisional application No. 60/078,435, filed on Mar. 18, 1998.

(51) Int. Cl.[7] .............................................. G06F 17/60
(52) U.S. Cl. ................................. 705/4; 705/36
(58) Field of Search ............................. 705/4, 35, 36, 705/1

(56) References Cited

U.S. PATENT DOCUMENTS

| | | | | |
|---|---|---|---|---|
| 5,839,118 A | * | 11/1998 | Ryan et al. | 705/36 |
| 5,864,828 A | * | 1/1999 | Atkins | 705/36 |
| 5,911,136 A | * | 6/1999 | Atkins | 705/36 |
| 5,913,198 A | * | 6/1999 | Banks | 705/4 |
| 5,991,744 A | * | 11/1999 | DiCresce | 705/36 |
| 6,012,043 A | * | 1/2000 | Albright et al. | 705/36 |
| 6,021,397 A | * | 2/2000 | Jones et al. | 705/36 |

FOREIGN PATENT DOCUMENTS

WO    WO 02/33580 A1 *  4/2002         G06F/17/00

OTHER PUBLICATIONS

Bell and Raud, A Graphical Approach to Retirement and Extate Planning, Nov. 1998, Journal of Financial Service Professionals, pp. 72–81.*

* cited by examiner

*Primary Examiner*—Joseph Thomas
*Assistant Examiner*—Christopher L. Gilligan
(74) *Attorney, Agent, or Firm*—McDermott, Will & Emery

(57) ABSTRACT

An economic security and financial planning method and system are disclosed. Their purpose is to calculate a household's highest sustainable living standard and determine the amount of saving and life insurance needed to finance and guarantee that living standard and subject to a) the household's preferences about changes over time in its living standard, b) the household's current and projected future demographic composition, c) the household's current and projected future economic resources, d) the household's borrowing constraints, e) the household's housing plans, and f) the household's need to make special expenditures, including bequests. The method and system are also designed to do contingent planning—to take into account the economic resources and special expenditure needs of survivors.

20 Claims, 1 Drawing Sheet

ECONOMIC SECURITY PLANNING METHOD AND SYSTEM

CROSS-REFERENCE TO RELATED APPLICATIONS

This application claims the benefit of Provisional application Ser. No. 60/078,435, filed Mar. 18, 1998.

STATEMENT REGARDING FEDERALLY SPONSORED RESEARCH

This invention was made with Government support under STTR Grant No. IR41AG13582, awarded by the National Institute of Aging. The Government has certain rights in the invention.

COPYRIGHT NOTICE

Copyright, 1997, Economic Security Planning, Inc. A portion of the disclosure of this patent document contains material which is subject to copyright protection. The copyright owner has no objection to reproduction by anyone of the patent document or the patent disclosure, as it appears in the U.S. Patent and Trademark Office patent file or records, but otherwise reserves all copyright rights whatsoever.

REFERENCE TO MICROFICHE APPENDIX

Not Applicable

BACKGROUND OF THE INVENTION

This invention relates to a method of and system for economic security and financial planning and, more particularly, to a method and system which utilizes consumption smoothing in combination with liquidity constraints and life insurance purchasing requirements.

Traditional financial planning methods are based on a targeted liability approach. Under this approach, households are asked to specify their particular needs, called liabilities. Typical liabilities include post-retirement income or expenditures, payment of college tuition, and the down payment for a house. Next, saving and insurance amounts are calculated to meet these liabilities. Households are advised to meet these targeted liabilities by saving each year the constant amount needed to advance-fund each liability.

The traditional method, which is used in current financial planning software packages, has many flaws. First, it does not directly and immediately assist households in smoothing their consumption over their life spans. Second, the method lacks a reasoned basis for setting its principal targets, namely the levels of income or expenditures desired after retirement and after the death of a spouse. Since traditional financial planning methods and software provide no clear criteria for setting the most important target—namely post-retirement income, financial planners and other users typically fall back on conventional and arbitrary rules of thumb, such as "70 percent of pre-retirement labor earnings." In other instances, the household is asked to supply these targets, which amounts to asking household members to plan for themselves.

Such targets can lead to highly inappropriate recommendations. For example, for households with high assets relative to labor earnings, a 70 percent replacement rate is likely to be much too low. Current financial planning software recommends that such households save relatively little (consume relatively a lot) prior to retirement. Consequently, those high-asset households that follow these recommendations will experience a significant decline in their living standard after retirement. For households with low net wealth relative to labor earnings, a 70 percent retirement income is likely to be too high. If such households follow the recommendations of current financial planning software, they will save relatively large amounts (consume relatively little) prior to retirement only to end up with a much higher living standard after retirement.

Financial planning software programs that form their targets by asking households to specify what they want to spend on particular commodities in retirement present a similar problem. If the household specifies too high a level of post-retirement consumption, it will be forced to cut back its current consumption by more than it may desire. If it specifies too low a level of post-retirement consumption, it will be encouraged to undersave.

Current methods for financial planning fail to adjust properly for household characteristics and circumstances. For example, they recommend the same amount of current saving to meet future target liabilities regardless of whether the household composition is expected to change over time, due to the anticipated arrival of new children or the departure of grown children. But it is appropriate for households to save less when, for example, dependent children are present and to save more, for example, when households have temporarily high income.

Traditional financial planning methodologies are not well suited for interpreting quantitative targets in terms of concrete consequences. The resulting recommendations are often highly unrealistic and therefore lack psychological cogency. Households are often told to save when they can least afford to—for example, when dependent children are present, and to spend when they can most afford to save—for example, when earnings are temporarily high. Depending on their circumstances, households may also be led to purchase far too much or far too little insurance.

Currently available methods fail to integrate savings and insurance decisions in a. satisfactory manner. Saving and insurance decisions are highly interdependent. Households that save more do not need to purchase as much insurance through time. Similarly, households that purchase more life insurance through time need to do less precautionary saving to protect against the death of the head or spouse. Traditional financial planning programs make their recommendations for life insurance independently of their recommendations for saving; i.e., they do not simultaneously solve for optimal saving levels and life insurance holdings.

Current financial planning does not fully integrate contingent planning in its life insurance calculations. For example, it does not take into account how the death of a spouse would affect the social security benefits received by his or her widow(er).

Typical financial planning programs fail to properly integrate multiple saving objectives, such as retirement income and college tuition. Instead, each objective is translated into an immediate, fixed saving requirement and these saving requirements are simply added together. But most households do not, and should not, behave this way. For example, they save first primarily for their children's college and, once they have paid for college, start saving in earnest for their retirement. In practice, experienced financial planners adjust their recommendations to try to compensate for the shortcomings of the traditional financial planning method. But even the most experienced financial planners cannot be assured that they are making the most appropriate adjustments, many of which involve complex calculations that can only be performed by computer.

Typical financial planning programs do not incorporate the limitations on households' abilities to borrow. Consequently, the current consumption levels implicitly being recommended by current programs (by subtracting current recommended saving from current income) may be infeasible because they would require the household to borrow more that it is able, even to maintain a minimum living standard. For example, if the household has temporarily low income or temporarily high special expenditures and has specified relatively high saving targets, meeting those targets may require borrowing to maintain a minimum living standard, but such borrowing may not be possible.

Current programs do not try to iterate to a smooth path of consumption over the life cycle because this can be a very time-consuming process. This is not surprising given that existing financial planning programs do not take consumption smoothing as their principal objective.

Traditional financial planning does not take into account economies to scale in share living and the associated changes in expenditure needs that arise from changes, over time, in a household's demographic composition. Similarly, it doesn't take into account the fact that children typically entail less expenditure relative to adults in order to maintain the same living standard (e.g., childrens' shoes cost less than adults' shoes).

These disadvantages of existing financial planning methods lead to saving and insurance prescriptions that often produce dramatic reductions or increases in a household's consumption after retirement and in the event of the death of a spouse; i.e., they disrupt, rather than smooth, consumption over the life cycle.

SUMMARY OF THE INVENTION

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

Figure 1:
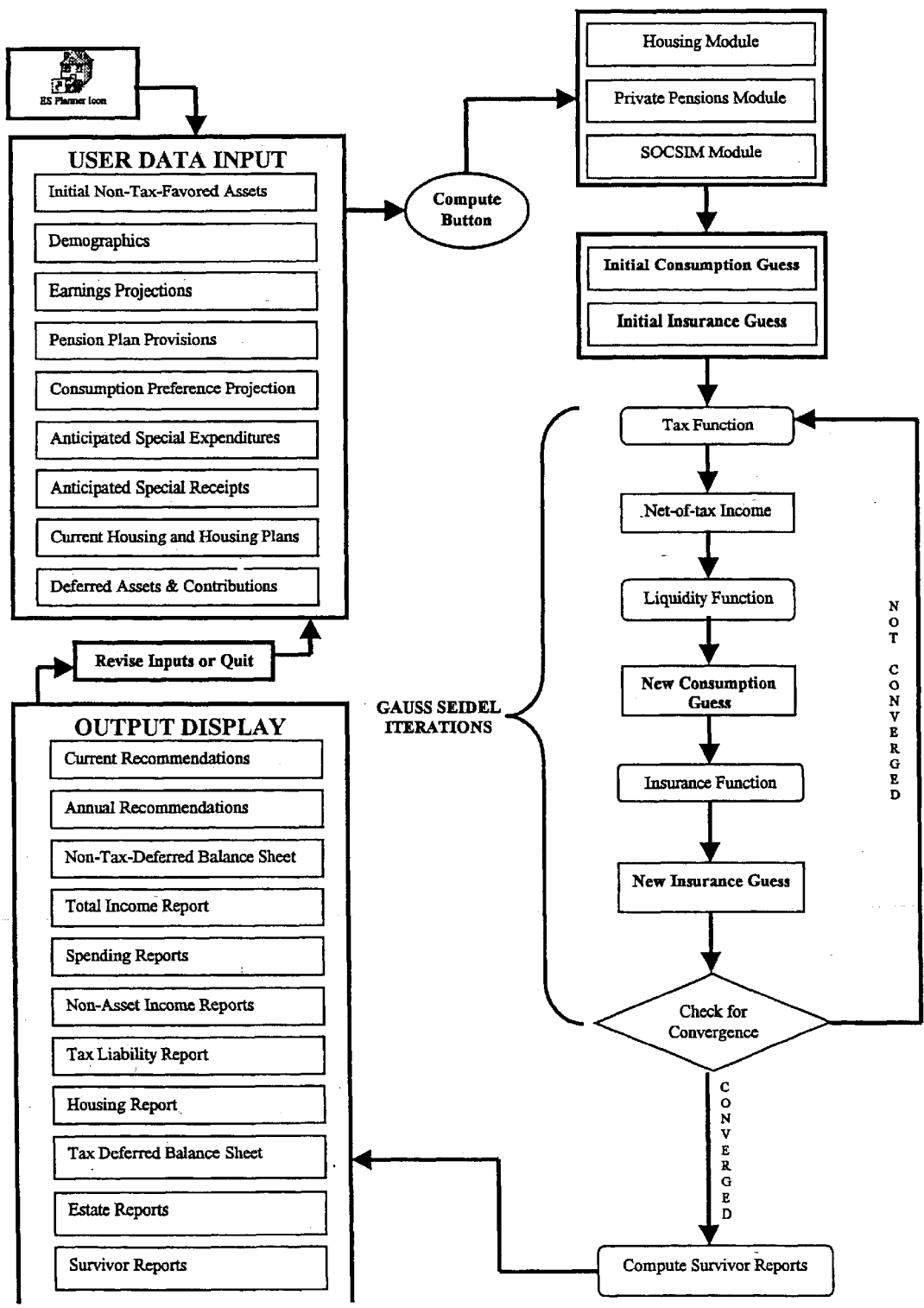
FIG. 1 is a flow diagram of a process for generating financial planning information including insurance purchase recommendations as a function input user data.

ESPlanner is designed to help households determine their maximum sustainable living standards subject to their available economic resources, tax liabilities, borrowing constraints, special expenditures, housing plans, demographic configurations, and other relevant variables, such as the life insurance premia they face, their contribution(s) limits on tax-favored saving accounts, and the rate(s) of return they expect to receive on non tax-favored and tax-favored saving.

After ESPlanner solves for a sustainable affordable living standard path, it translates this path into two primary recommendations—the amount the household should spend each year on consumption and on term life insurance policies. In the case of married couples, ESPlanner provides separate life-insurance recommendations for the husband and the wife.

The living standard path is determined as the amount of consumption per adult that can be sustained. To determine each year's total consumption expenditures, ESPlannermultiplies the calculated living standard by that year's number of equivalent adults in the household. The number of equivalent adults in the household can vary from year to year because of children being born or leaving the household (which happens from the reach age 19) or because one spouse predeceases the other.

ESPlanner provides a series of reports comparing current behavior to recommended behavior, detailing annual recommended consumption expenditure and the face values of recommended term life insurance policies, a lifetime balance sheet for non tax-favored as well as tax-favored net worth, annual tax payments and its components, annual total income and its components, annual non-asset income and its components, annual spending on consumption, life insurance premium, special expenditures, and housing, annual housing expenditures and its components, as well as annual home mortgage and equity balances, annual social security benefits and its components, and annual contingent estates for each spouse (estates that would be left by a spouse or single household head were the spouse or single household head to die in that year).

ESPlanner also provides the same set of reports for surviving spouses contingent on the date of the other spouse. Thus a household using ESPlanner can see the economic situation that would face survivors at each possible future date at which one of the spouses might die. As in the case of the standard reports, the survivor reports provide recommended consumption and life insurance purchases. No other financial planning software package provides such recommendations for contingent survivors. In displaying the survivor reports, ESPlanner shows its users that it survivors will be able to afford as high a living standard as the household enjoyed when both spouses were alive.

ESPlanner uses a complex dynamic programming algorithm that takes into account the above-mentioned constraints as well as the constraint that households cannot purchase negative amounts of life insurance. No existing financial planning software simultaneously solves for a household's highest regular (when both spouses are alive) and contingent (when one or both spouses is deceased) sustainable living standard path subject to borrowing constraints and non-negativity constraints on the purchase of life insurance. The algorithm used is unique not only with respect to what it does, but also with respect to how it does it. As detailed below, it solves two dynamic programs interactively until it converges to a solution.

ESPlanner is a software package designed to assist individuals and couples (henceforth referred to as "families" or "households") in lifetime financial planning, specifically, life-cycle consumption smoothing. For each future year of the household's expected lifetime, ESPlanner calculates the amount of saving and life insurance coverage that the household needs to smooth its future consumption. The software's objective is to maintain the household's living standard through time to the extent this objective is desired and is feasible, given the household's borrowing constraint. Part of maintaining the household's living standard through time involves recommending life insurance holdings that permit survivors to maintain a living standard that is as high as the household enjoyed prior to the death of a spouse.

ESPlanner also helps households decide a) how hard to work, b) when to retire, c) when to start collecting Social Security retirement benefits, d) how much to contribute to tax-favored saving accounts, e) how large a family to have, f) how much money to leave as bequests, g) when to start withdrawing funds from tax-favored saving accounts, and a variety of related issues. ESPlanner helps households make these decisions by showing them the implications for their sustainable standard of living of different choices with respect to each of these decisions. Another key feature of ESPlanner is its assistance to households in determining exactly how much they are currently saving. This is critically important, since any saving recommendation needs to be set against actual behavior.

ESPlanner's recommendations on saving and insurance purchases are based on household-specific demographic and financial information and on some key economic assumptions. The following sections describe the operation of the software—the information that users must enter, the method of computation, and the output that is displayed once the program has been executed.

Description of USER INPUT

The program requires the user to enter information on the following items:

Demographic Data
1) Date(s) of birth
2) Number of children and their years of birth
3) Maximum length(s) of life
4) Child-adult equivalency factors by age of child (through age 18) (See Appendix D)
5) Extent of economies from joint living (See Appendix D)
Financial Data
1) Assets in non-tax-deferred accounts—like stocks, bonds, mutual funds, checking accounts etc.
2) Projected earnings from wages and salaries and from self-employment*
3) Actual or projected years of retirement*
4) Pension plan provisions
5) Social Security covered earnings*
6) Actual or projected year(s) and month(s) of first collecting Social Security benefits*
7) The amount(s) of current Social Security benefits (if any)
8) Term value of life insurance in force
9) Current housing situation and future housing plans
10) Assets in tax-deferred saving plan(s) and plan contribution(s)*
11) Funeral plan(s)
12) Desired bequest(s)
13) Anticipated special expenditures*
14) Anticipated special receipts*
15) Maximum allowable indebtedness
16) Relative living standard preference for future years (For starred (*) items, regular and contingent inputs are required from each spouse. Regular data pertains to the case where both spouses are alive and contingent data to the case when the other spouse is dead.)
Economic Assumptions
1) Expected rate of inflation
2) Expected rate of return on non tax-deferred assets
3) Expected rate(s) of return on tax-deferred assets
4) Expected share of capital gains in income from assets Computation Method As indicated in the Chart 1, the program first calculates the following items:
1) Projected real housing expenditure (rent and/or mortgage payments, down payments, property taxes, home insurance and maintenance expenditure);
2) Real value of income (for primary beneficiaries and survivors) from employer pension plans; and
3) Real value of Social Security, retirement, spousal, survivor, mother/father, and child benefits The computation of Social Security benefits are done by SOCSIM, a routine that was developed specifically for ESPlanner. SOCSIM is described in Appendix C.

At this point, the program begins Gauss-Seidel iterations for computing sustainable consumption and term insurance purchases. The initial inputs for these iterations are guesses of the lifetime consumption profile and the lifetime profile of insurance purchases (see Chart I). These iterations involve repeated calls to the Tax Function, the Liquidity Function, and the Insurance Function (in that order) until the values of consumption and insurance purchases in each year of the household's remaining lifetime have converged to within a pre-specified tolerance (a tenth of a penny). Saving and non-deductible asset accumulation during each future year are generated as by-products during these iterations. A description of the three functions follows:

Tax Function

Calculations of tax liabilities require knowledge of consumption, housing expenditure, special expenditures and receipts, and spending on insurance premiums in each year of the family's remaining lifetime. Of these, housing, special expenditures, and special receipts are known from user input. Consumption and insurance premium payments are unknown and are set as arbitrary guesses during the first iteration. The guesses are updated in subsequent iterations by the liquidity and the insurance functions.

I. Regular Tax Liability

For each future year of the family's lifetime, payroll taxes, and federal and state income taxes are calculated in the following manner:

1. In each year, asset income is calculated as initial assets times the nominal rate of return on non-tax-deferred assets.
2. Payroll Taxes: The family's payroll tax liability is calculated in two stages: i) The payroll tax base is computed as the smaller of the maximum taxable earnings limit and labor earnings and the result is multiplied by the employee payroll tax rate of 7.65 percent; ii) If labor earnings are less than the maximum taxable earnings limit, earnings from self employment income, if any, up to the difference between the maximum taxable earnings limit and labor earnings are taxed at the full employer plus employee tax rate of 15.3 percent.
3. State Income Taxes: The family's state income tax base is calculated as income from assets plus labor earnings plus income from self employment plus pension income less employee deductible contributions to tax-deferred saving plans. If funds are being withdrawn from a tax-deferred saving plan, income from tax-deferred employee and employer accounts in the savings plan is included in the tax base. The tax liability is calculated by subtracting the allowed exemptions (depending on family composition) and applying the state tax rate(s) to the remainder. Separate rates may be applicable to labor and capital income components of the state tax base (as in the case of Massachusetts).
4. Federal Income Taxes: The federal tax base (aka. adjusted gross income [AGI]) is calculated as social security benefits subject to income tax plus the state tax base. Taxable income equals AGI less the greater of the standard or itemized deductions and exemptions. Itemized deductions include deductions on account of the state taxes, interest payments on home mortgages, charitable and other deductions. Users provide information about the latter two deductions. Exemptions depend upon the family demographics and the size of AGI. The tax liability is computed by applying the appropriate federal income tax rates depending on the tax bracket in which the taxable income falls.

5. Final Assets: Given the values of total income, consumption, insurance premia, special expenditure and receipts, housing expenditure, and tax payments, assets remaining at the end of the year are calculated by subtracting total spending from initial assets plus income. These assets serve as the basis for computing asset income for the subsequent year.

Contingent Tax Liability

For each possible year of each spouse's death (up to each spouse's pre-specified terminal year), the remaining lifetime payroll taxes and federal and state income taxes are calculated for the surviving household in the same manner as under (I) above. For each calculation sequence, the assets in the tax deferred saving plan of the deceased spouse are added to those of the surviving spouse (separately for employer and employee deductible accounts and employee non-deductible account). Non tax-deferred and housing assets (if any) are also inherited by the surviving household. Now, calculations are based upon contingent earnings, contingent special expenditures and receipts, and contingent contributions to tax deferred saving plans.

Liquidity Function

Consumption and saving recommendations are subjected to a borrowing constraint. For example, suppose the family's preferred relative consumption profile is flat (consumption is the same in each future year). In addition, suppose that both parents are graduate students earning a small stipend, but expecting to earn many times more upon completing their studies. A high anticipated future earnings profile implies a high level of sustainable consumption. However, to achieve the sustainable level of consumption while still in graduate school (as required by the family's preference for a flat relative consumption profile) would involve borrowing large sums of money during the first few years. Borrowing in the early years may imply the accumulation of a debt larger than the family specifies as its maximum allowable indebtedness. In such cases, the program recommends the flattest possible consumption profile that does not violate the borrowing constraint. In this case it would restrict consumption during the first few years and increase it in the subsequent years when earnings are high.

The liquidity function computes the standard of living that can be supported by the household's "disposable" income. Disposable income is calculated as earnings from wage and salary income, self employment income, pension income, social security benefits (including child benefits, if any), special receipts, withdrawals from tax-deferred savings plans less tax payments, employee (deductible and non-deductible) contributions to tax-deferred saving plans, special expenditures, housing expenditures, and expenditures on insurance premiums. Hence, disposable income depends on the annual tax payments calculated earlier in the Tax Calculator. However, because annual tax payments depend, in part, on annual asset incomes, they are a function of the initial consumption and insurance guesses. The higher is the initial guesses of consumption and insurance, the lower will be the calculated asset incomes and tax payments.

The dynamic programming algorithm for the liquidity function is described in Appendix A. The liquidity constraint is designed to allow the maximum sustainable consumption without the household ever being forced into indebtedness greater than a pre-specified limit. Thus, low disposable income early in life will require low consumption early in life. As disposable income increases, so will sustainable consumption, but only if the marginal addition to consumption is feasible—that is, it does not imply an addition to debt at some future date beyond the maximum-indebtedness limit. If income is high early in the family's lifetime but low later on, consumption is maintained at its maximum sustainable level consistent with the family's relative living standard preference profile. That is, enough saving is generated such that consumption does not have to be any lower despite lower disposable income in future years. The liquidity constraint may, therefore, override the household's relative living standard preference profile and dictate a different path of consumption if (but only if) the preferred profile will result in the violation of the maximum-indebtedness constraint.

The output of the liquidity constraint function is a new consumption profile. This profile specifies the amount of consumption that can be sustained consistent with the family's relative consumption preference, but modified by the requirement that household debt not exceed the pre-specified maximum limit.

Insurance Function

Given the sustainable consumption profile, the insurance function computes the amount of life insurance that both, husband and wife must purchase in order to sustain the other spouse's standard of living as a survivor (with children, if any). These calculations take into account the possibility that the surviving parent may need to purchase life insurance in order to ensure the standard of living of surviving children prior to reaching adulthood. Recommended life insurance purchases also take into account planned bequests and funeral expenses. The algorithm used for calculating required life insurance purchases is described in Appendix B.

The method of computing term insurance for each period is based on the following reasoning: Let the last year of life of the last adult (husband or wife) to die be the $80^{th}$ year of his or her life. The estate bequeathed at the end of the $80^{th}$ year must cover the present value of consumption of surviving children,(if any). The required assets at beginning of the $80^{th}$ year must be sufficient to finance the household's consumption at the end of the $80^{th}$ year given the income projected for that period and the estate that must be bequeathed. Thus, to cover the loss of income in the $80^{th}$ year in case this person should die at the end of the $79^{th}$ year, the term insurance, that must be purchased at the end of the $79^{th}$ year must cover the excess of the $80^{th}$ year's consumption of the surviving household members (children, if any) over their income. These calculations yield the required assets, the term insurance, and the insurance premium at the end of the $79^{th}$ year and, given income and consumption at the end of the $80^{th}$ year, the saving that must be undertaken in this year. Note, that we now have the required assets at the end of the $79^{th}$ year. The same reasoning can be used to calculate required assets, term insurance, and the insurance premium at the end of the $78^{th}$ year, and required saving in the $79^{th}$ year.

This process of solving for required assets etc. for each previous year brings us to the last year of life of the spouse that dies first. Let this be the $70^{th}$ year of the other spouse (the one to die last). In solving for the $71^{st}$ year's required saving, required assets at the end of the $70^{th}$ year would have been calculated. Now, in each period's calculation, two term insurance values are computed to cover the loss of income in case either spouse should be the one to die prematurely.

In order to understand the following reasoning it is essential to refer to Appendix B "Calculations for the penultimate period of life, T-1" [the equations are labeled (2), (2a), (2b), etc.]. Assume that T corresponds to the last year that both husband and wife are alive. In the section describing the algorithm for insurance purchases for the husband (superscript h), $I^h_{T-2}$, and surviving wife (superscript ws), $I^{WS}_{T-1}$, note that step C ensures that the husband's insurance purchase is never negative: If equation (2c") produces a negative value, then the value is reset to zero. However, because $I^h_{T-2}$, determines $I^{WS}_{T-1}$ [see equation (2a')], $I^{WS}_{T-1}$ is recomputed using equation (2a') (see step D in algorithm). Because algebraically increasing the value of $I^h_{T-2}$ lowers $I^{WS}_{T-1}$, [$I^h_{T-2}$ enters with a negative sign in equation (2a')], $I^{WS}_{T-1}$ may itself now become negative. If this occurs, step E of the algorithm resets $I^{WS}_{T-1}$ to zero. Again, because $I^h_{T-2}$ depends on the value of $I^{WS}_{T-1}$ [see equation (2c)], we must recompute $I^h_{T-2}$. However, now $I^h_{T-2}$ will be higher than before because $I^{WS}_{T-1}$ enters equation (2c) with a positive sign and we (may have) increased the value of $I^{WS}_{T-1}$. This process of alternately resetting each of the variables from negative to zero and recomputing the other continues until both values have converged to within a pre-specified tolerance. For any year, t, the computations replicate this procedure and check for the convergence of each of the values of $I^h_{t-1}, I^{WS}_t, I^{WS}_{t+1}, \ldots I^{WS}_{T+S}$, where T is the last year in which both husband and wife are alive, and T+S is the last year of the wife's life.

This process of solving for required assets and income from the last year of the household's life to the first (the current year) generates a stream of required assets, term insurance purchases, and saving that the household must undertake to support the consumption profile provided by the Liquidity Function. The term insurance solutions ensure that, no matter when in the future the husband or wife should die, the surviving household will be able to afford the same or greater standard of living per capita as the original household. This can be confirmed by executing the Survivor Reports Function.

Survivor Reports Function

This function operates only for married couples. It takes as input hypothetical dates of death of the husband and wife and generates a survivor report for each spouse. Users can confirm that purchasing the recommended amounts of term insurance does indeed assure the surviving household at least the pre-specified standard of living. These reports can be used to review the surviving household's consumption, asset and non-asset incomes, expenditures etc. for different hypothetical dates of death of either spouse.

ESPlanner's Output

ESPlanner produces different spreadsheet-type reports showing the evolution of the household's finances over its remaining lifetime assuming that the household undertakes the recommended amounts of consumption, saving, and life insurance purchases. All amounts are reported in constant (current-year) dollars.

Household Reports

Current Recommendations: This report compares the household's current non-tax-favored saving, consumption, and life insurance purchase(s) with their recommended amounts. The difference between actual and recommended amounts equals the recommended change in each of these items for the current year.

Annual Recommendations: This report shows the recommended amounts of non-tax-favored saving, consumption and life insurance purchase(s) for future years.

Non-Tax-Favored Balance Sheet: This report shows the household's total income, net tax favored payments, total spending, total taxes, non-tax-favored saving, and net worth. Net tax-favored payments represent contributions to tax-deferred saving plans less withdrawals from these plans. Because interest on non-tax-favored assets is included in total income, non-tax-favored net worth in any year equals non-tax-favored saving plus non-tax-favored net worth in the previous year.

Total Income: This report shows the breakdown of total income into non-asset income (income from wages and salaries, self-employment income, pensions, and Social Security benefits), special receipts, and interest on non-tax-favored assets.

Total Spending: This report shows the breakdown of total spending into recommended consumption, special expenditures, housing expenditures, expenditures on life insurance premiums, and end-of-life (bequests and funeral) expenses.

Non-Asset Income: This report shows the components of non-asset income, that is, labor income (wages and salaries plus self-employment income), pensions, and Social Security benefits.

Taxes: This report decomposes total taxes into federal and state income taxes, and payroll taxes.

Housing Expenditure: This report lists the different components of spending on housing. It shows the amounts spent on rent and other rental expenses, mortgage payments, property taxes, home maintenance and condo fees, homeowner's insurance premium payments, and down-payments made during home purchases net of proceeds from home sales. The final two columns of this report indicate the sizes of mortgage balances and home equity.

Tax-Favored Balance Sheets: These reports show annual interest income, contributions and the account balance in tax-favored savings accounts. Contributions are broken down into employer and employee tax-favored contributions and employee non-deductible tax-favored contributions. These plus the interest income on existing tax-favored balances comprise tax-favored saving. Net tax favored net worth in any year is the sum of current tax-favored saving and the previous year's tax-favored balance.

Estate Reports: These reports show the estates that would be left to survivors at each possible age of death of an adult household member. The non-tax-favored estate is the sum of household non-tax-favored net worth plus the life insurance payout upon death less bequest and funeral expenses and estate tax payments. The tax-favored estate equals the decedent's tax-favored saving plan balance.

Social Security Benefits: These reports show the household's net Social Security benefits by recipient and by reason for receipt of benefit. Benefits are shown separately for adults (husband and wife, or single parent) and children. Adults' benefits are broken down into gross retirement and spousal benefits. The net benefit is the sum of these benefits less the amount of the earnings reduction.

Survivor Reports: These reports are available only for married households. The survivor function is executed automatically upon completion of the main routine for the two contingencies of the husband or wife dying in the current year. This function can be recomputed for any future year of death of either spouse. The survivor reports provide information on the evolution of the surviving household's finances.

Annual Recommendations: This report shows the surviving household's non-tax-favored saving, consumption, and life insurance purchases.

Non-Tax-Favored Balance Sheet: This report shows the surviving household's total income, contributions to tax-favored saving plans, total spending, total taxes, non-tax-favored saving and the non-tax-favored net worth.

Total Income: This report provides a breakdown of total income nonasset income (labor income, pensions, and Social Security benefits), special receipts, and interest on non-tax-favored assets.

Total Spending: The components of total spending are shown in this report. These include spending on consumption, special expenditures, housing expenditures, life insurance premium payments, and bequest and funeral expenditures in excess of net proceeds from the sale of any existing homes.

Non-Asset Income: This report lists the components of nonasset income, namely, labor income, pensions, and Social Security benefits of the surviving household.

Total Taxes: This report shows the components of total taxes, namely, federal and state income taxes and payroll taxes paid by the surviving adult.

Housing Expenditure: This report lists the different components of spending on housing by the surviving household. It shows the amounts spent on rent and other rental expenses, mortgage payments, property taxes, home maintenance and condo fees, homeowner's insurance premium payments, and down-payments made during home purchases net of proceeds from home sales. The final two columns of this report indicate the sizes of mortgage balances and home equity.

Tax-Favored Balance Sheet: This report shows annual interest income, contributions, and account balance in the surviving adult's tax-favored savings account. In the first year, the balance in the surviving spouse's tax-favored account is the sum of the previous year's balances in the accounts of the deceased and surviving spouse plus interest income and current year contributions of the surviving spouse. Contributions are broken down into employer and employee tax-favored contributions and employee non-deductible tax-favored contributions. These plus the interest income on existing tax-favored balances comprise tax-favored saving. Net tax favored net worth in any year is the sum of current tax-favored saving and the previous year's tax-favored balance.

Estate Report: This report shows the estates that would be left to surviving children at each possible year of death of the surviving adult. The non-tax-favored estate is the sum of household non-tax-favored net worth plus the life insurance payout upon death less estate taxes and bequest and funeral expenses in excess of net proceeds from the sale of homes, if any. The tax-favored estate equals the decedent's tax-favored saving plan balance.

Social Security Benefits: This report shows a breakdown of the net Social Security benefit of the surviving adult by reason for receipt of benefit. These include gross own retirement, gross widow(er), and gross mother/father benefits. The surviving adult's net benefit is the sum of these benefits less the earnings reduction. Also shown are the benefits received by surviving children.

ESPlanner is unique in its ability to calculate how much, in each future year, a household needs to save and how much life insurance it needs to purchase to attain the highest sustainable living standard. In performing its calculations, ESPlanner takes into account a) the household's preferences about changes over time in its living standard, b) the household's current and projected future demographic composition, c) the household's current and projected future economic resources, c) the household's borrowing constraints, d) the household's housing plans, e) the household's need to make special expenditures, including bequests, and f) the fact that life insurance holdings cannot be negative.

ESPlanner is also unique with respect to its contingent planning—its ability to take into account the economic resources and special expenditure needs of survivors. These variables are critical inputs into ESPlanner's calculations of the amount of life insurance needed to sustain the living standard of survivors.

In determining the life insurance needs of the household, ESPlanner considers the fact that survivors may themselves need to purchase life insurance. For example, a surviving working widow with children may need to purchase life insurance to protect her children. ESPlanner considers not just the life insurance that the husband and wife need to purchase when both spouses are alive, but also the life insurance that the husband or wife would need to purchase if they were a survivor (i.e., if they were a widower or a widow). Since the premia paid for these: contingent insurance purchases are a claim on the widower's or widow's resources, they must be taken into account in determining the proper amount of life insurance the widower and widow should receive from their decedent wife and husband, respectively. Thus, there is a simultaneity involved in the choice of each spouse's life insurance holdings while the couple is alive and the life insurance holdings of the other spouse as a widow(er). For example, the more life insurance the husband purchases when his wife is alive, the less life insurance she'll need to purchase if he dies. But one can't determine how much life insurance the husband needs to have without knowing how much the wife will be spending on insurance premia as a widow. ESPlanner's unique algorithm solves simultaneously for regular (when both spouses are alive) and contingent (when one spouse is dead) life insurance holdings. It does so taking into account non negativity constraints on all insurance purchases, and it does so for all contingencies—for all possible dates at which either the husband or wife could die in the case of a couple and for all possible dates at which the household head could die in the case of a single household.

ESPlanner not only has a unique objective, but it solves its special problem with a unique algorithm that involves iterating between two dynamic programs—the Liquidity Function and the Insurance Function. Each of these functions takes the results of the other as given in performing its calculations. Convergence of the overall algorithm occurs when the two functions have jointly converged; i.e., when the insurance premium payments, which are part of the input into the Liquidity Function, are (to a very high order of precision) those generated by the Insurance Function, which is based on the consumption expenditure outputted by the Liquidity Function. This approach—using two dynamic programming algorithms iteratively—represents a departure from the standard approach to dynamic programming which, in this context, would attempt to use a single dynamic program to simultaneously solve for the optimal choice of consumption and regular and contingent life insurance amounts subject to liquidity constraints. The standard dynamic programming approach would require calculating regular and contingent life insurance holdings for each possible level of household non tax-favored net wealth in each year. In contrast and in effect, ESPlanner's iterative algorithm permits the calculation of regular and contingent life insurance holdings only for the trajectory of household non tax-favored net wealth that would actually be chosen while the couple remained alive.

Although the academic economics literature contains models of consumption smoothing with liquidity constraints and consumption smoothing with life insurance purchase, no previous model has combined these three elements: consumption smoothing, life insurance purchase, and borrowing/liquidity constraints. Nor has any previous model calculated contingent insurance demands or taken into account the array of special expenditure, special receipts, housing plans, estate plans, economies of shared living, child-adult equivalency ratios, and other factors considered by ESPlanner.

ESPlanner's novel features are a) its calculation of the saving and life insurance holdings needed to attain the household's highest sustainable living standard subject to the elements listed above, b) its iterative, twin dynamic programming functions, c) its contingent planning for survivors, d) its consideration of contingent data, e.g., contingent earnings and Social Security survivor benefits, e) its treatment of housing and special expenditures as "off-the-top" expenditures that enter the algorithm effectively as negative income; i.e., housing and special expenditures are not smoothed by the program, whereas consumption expenditures are smoothed. The software also contains a "grow button" which represents a novel method of inputting projected future earnings streams and a unique set of standard and survivor output screens, including balance sheets.

Liquidity Function: Description of Algorithm

Definitions:
$A_0$=non-tax-deferred assets in period 0
$A_T$=End-of-life required assets (given)
D=maximum indebtedness
$E_t$=non-asset income in period t net of taxes, special expenditures, deferred contributions, insurance premia, tc.
g=grid point index
$\Delta$=grid step
T=terminal year of calculation (last year of surviving spouse)
R=gross real rate of return on non-deferred assets
$n_t$=# of equivalent adults in household
$c_t$=relative consumption preference
$m_t = n_t \times c_t$
G=# of grid steps [Note: # of grid points =G+I]
$\epsilon$=tolerance value for checking convergence Initialization of grid range:
(1) $A_0^{max}=A_0+\max(100, E_1)$ $$A_s^{max} = \sum_{t=1} E_t R^{(t-1)}, \quad s = 1 \ldots T-1 \quad (2)$$

(3) $A_S^{min}=-D$, s=0... T-1

Algorithm:

$$\Delta = \max_{s=0 \ldots T-1}[A_s^{max} - A_s^{min}]/G \quad (4)$$

(5) Define grid space over assets $A_t(g)$, g=0... G, such that $A_t(0)=A_t^{min}$ and $A_t(g+1)=A_t(g)+\Delta$
Consumption function for period T
6) Compute $C_T(g)=(A_{T-1}(g)\times R+E_T-A_T)/m_T$, g=0 ... G, to yield functions $C_T(g)=C_T[A_{T-1}(g)]$ Consumption function for period t, $1 \le t<T$
(7) For each g, compare $\{A_{t-2}(g)\times R+E_{t-1}-_{C_T[A_{T-1}}(0)]\times m_{t-1}\}<=>A_{t-1}(0)$
If < or = are true, then set $C_{t-1}(g)=[A_{t-2}(g)\times R+E_{t-1}-A_{t-1}(0)]/m_{t-1}$
If < is true, then find g such that:
$C_t[A_{t-1}(g)]>[A_{t-2}(g)\times R+E_{t-1}-A_{t-1}(g)]/m_{t-1}$
and
$C_t[A_{t-1}(g+1)]<$ or $=[A_{t-2}(g)\times R+E_{t-1}A_{t-1}(g+1)]/m_{t-1}$
to yield:
$C_{t-1}(g)=C_t[A_{t-1}(g)]=C_{t-1}[A_{t-2}(g)]$ (8) Trace consumption forward using:
$C_1[\text{int}(A_0/\Delta)]$;
$A_1=[A_0\times R+E_1-C_1]/m_1$,
$C_2[\text{int}(A_1/\Delta)]$; ... etc.

(9) Redefine
$A_s^{max}$, $A_s+n\times g$
s=0... T-1
$A_s^{min}=\min[-D,A_s-n\times g]$
s=0 ... T-1
... where n is an integer <G

(10) Convergence: Check if $\Delta<\epsilon$ for some small value of $\epsilon$
(11) If converged, then quit; else go to step (4).

Insurance Function: Derivation and Algorithm

Notation
i) R=(1+r) where r is the real interest rate
ii) Superscripts:
   H Household
   ws=wife as survivor
   hs=husband as survivor
   K=household of surviving kids
iii) Subscripts:
   T=last year both will be alive
iv) $A_t$ refers to the assets at the end of period t.
v) All action occurs at the end of a period:
   1) non asset after-tax and after-government transfer payment income Y
   2) receipts from insurance payments (if any) I
   3) consumption (including special and housing expenditures, and inheritances) C
   4) premium payments for insurance purchases p*I
   5) death—which triggers funeral expenses plus bequests FB
   6) liquidation of the home (if a surviving spouse dies) occurs at 94% of home equity—HEQ due to transactions cost
vi) A 'PV' prefix indicates 'present value' of the variable; e.g. $PVC_t$ represents the present value of consumption as of the end of period t.
vii) FB and HEQ are charged immediately upon death but insurance payments are not received by the surviving household until a period later. Hence, it is assumed that insurance purchases cover FB*R for a primary insurance purchase and (FB*R- HEQ*R) for a surviving spouse's insurance purchase.
viii) The price, p, of $1 of insurance=discounted probability of death during the next period.
   $A_T$=terminal assets at the end of the couple's last possible period of being jointly alive.
ix) The equations for the wife as the primary insurance purchaser are symmetric to those of the husband as the primary insurance purchaser. Only the equations for the husband as the primary purchaser are enumerated.

Algebra and Algorithm
Calculation for the last period of life, T
Required assets at the end of period T-1:

(1) $A_{T-1}=[A_T+C^H_T-Y^h_T-Y^W_T]IR$

Side condition for primary insurance purchases by husband:

(1a) $I^h_{T-1}=[PVC^{WS}_T-PVY^{WS}_T]+[FB^{h*}R-A_{T-1}R]$;

Algorithm for $I^h_{T-1}$ (A) Use (1a) to obtain an initial value: $I^h_{T-1}{}^1$ (B) Set $\hat{I}^h_{T-1}{}^1=I^h T_{-1}{}^1$ (C) If $\hat{I}h_{T-1}{}^1<0$ set $\hat{I}^h_{T-1}{}^1=0$ Calculation for the penultimate period of life, T-1
Required assets at the end of period T-2:

(2) $A_{T-2}=[A_{T-1}+C^H_{T-1}+p^h_{T-1}*\hat{I}^h_{T-1}+p^W_{T-1}*\hat{I}^W_{T-1}-Y^h_{T-1}-Y^W_{T-1}]/R$ Side condition for insurance purchase by wife as survivor at the end of period t-1:

(2a) $I^{WS}_{T-1}=[PVC^k_T-PVY^k_T]+[FB^{W*}R-HEQ_{T-1}*R]-A^K_{T-1}*R$ (2b) $A^K_{T-1}=A_{T-2}*R+(I^h_{T-2}-FB^{h*}R)-(C^{WS}_{T-1}-Y^{WS}_{T-1})-p^WT_{-1}*I^{WS}_{T-1}$

Substitute (2b) into (2a) to get (2a') $I^{WS}_{T-1}=\{[P_{VC}{}^kT-P_{YY}{}^k_T]+[FB^{W*}R-HEQT-1^{*R}]\}/(1-R*p^WT_{-1})-[A_{T-2}*R+(I^h_{T-2}-FB^{h*}R)-(C^{WS}_{T-1}-Y^{WS}_{T-1})]*[R/(1-R*p^W_{T-1})]$ Side condition for primary insurance purchase by husband at the end of period t-2:

(2c) $I^h_{T-2}=(PVC^{WS}_{T-1}-PVY^{WS}_{T-1})+FB^{h*}R+p^W_{T-1}*I^{WS}_{T-1}-A_{T-2}*R$

Substitute (2a') into (2c):

(2c') $I^h_{T-2}=FB^{h*}R+\{(C^{WS}_{T-1}-Y^{WS}_{T-1})+[(PVC^K_T-PVY^K_T)+(FB^{W*}R-HEQ_{T-1}*R)]*p^W_{T-1}\}+\{(PVC^{WS}_T-PVY^{WS}_T)*(1-R*p^W_{T-1})/R\}-A_{T-2}*R$

[The next step makes computations easy] Substitute for $(PVC^{WS}_T-PVY^{WS}_T)$ from (1a) to get:

(2c") $I^h_{T-2}=FB^{h*}R+\{(C^{WS}_{T-1}-Y^{WS}_{T-1})+[(PVC^K_T-PVY^K_T)+(FB^{W*}R-HEQ_{T-1}*R)]*p^W_{T-1}\}+\{[I^h_{T-1}-FB^{h*}R+A_{T-1}*R]*(1-R*p^W_{T-1})/R\}-A_{T-2}*R$

Substitute (2c") into (2a') to get:

(2a") $I^{WS}_{T-1}=[PVC^k_T-PVY^k_T]+[FB^{W*}R-HEQ_{T-1}*R]-[I^h_{T-1}-FB^{h*}R+A_{T-1}*R]$

Algorithm for $I^h_{T-2}$ and $I^{WS}_{T-1}$ (A) Use (2c") and (2a") to get initial values: $I^h_{T-2}{}^1$ and $I^{WS}_{T-1}{}^1$ (B) Set $\hat{I}^h_{T-2}{}^1=I^h_{T-2}{}^1$, and $\hat{I}^{WS}_{T-1}{}^1=I^{WS}_{T-2}{}^1$ (C) If $\hat{I}^h_{T-2}{}^1<0$ set $\hat{I}^h_{T-2}{}^1=0$ (D) Use $\hat{I}^h_{T-2}{}^1$ in (2a') to compute a new value: $\hat{I}^{WS}_{T-1}{}^2$ (E) If $\hat{I}^{WS}_{T-1}{}^2<0$, set $\hat{I}^{WS}_{T-1}{}^2=0$ (F) Use $\hat{I}^{WS}_{T-1}{}^2$ in (2c) to compute a new value: $\hat{I}^h_{T-2}{}^2$ (G) For a tolerance $\epsilon>0$, if $Abs[\hat{I}^h_{T-2}{}^1-\hat{I}^h_{T-2}{}^2]<\epsilon$ and $Abs[\hat{I}^{WS}_{T-1}{}^1-\hat{I}^{WS}_{T-1}{}^2]<\epsilon$ then stop.

(H) If (G) is not satisfied, set $\hat{I}^h_{T-2}{}^1=\hat{I}^h_{T-2}{}^2$ and $\hat{I}^{WS}_{T-1}{}^1=\hat{I}^{WS}_{T-1}{}^2$ (I) Return to Step (C).

Calculations for the period T-2
Required assets at the end of period T-3:

(3) $A_{T-3}=[A_{T-2}+C^H_{T-2}+p^h_{T-2}*\hat{I}^h_{T-2}+p^W_{T-2}*\hat{I}^w_{T-2}-Y^h_{T-2}-Y^w_{T-2}]$ Side condition for insurance purchases by wife as survivor at the end of period T-2:

(3a) $I^{WS}_{T-2}=[PVC^k_{T-1}-PVY^k_{T-1}]+[FB^{W*}R-HEQ_{T-2}*R]-A^K_{T-2}*R$ (3b) $A^K_{T-2}=A_{T-3}*R+(I^h_{T-3}-FB^{h*}R)-(C^{WS}_{T-2}-Y^{WS}_{T-2})-p^W_{T-2}*I^{WS}_{T-2}$

Substitute (3b) into (3a):

(3a') $I^{WS}_{T-2}=\{[PVY^k_{T-1}-PVY^k_{T-1}]+[FB^{W*}R-HEQ_{T-2}*R]\}/(1-R*p^W_{T-2})-[A_{T-3}*R+(I^h_{T-3}-FB^{h*}R)-(C^{WS}_{T-2}-Y^{WS}_{T-2})]*[R/(1-R*p^W_{T-2})]$

Side condition for insurance purchases by wife as survivor at the end of period T-1:

(3c) $I^{WS}_{T-1}=[PVC^kT-PVY^k_T]+[FB^{W*}R-HEQ_{T-1}*R]-A^K_{T-1}*R$ (3d) $A^K_{T-1}=[A_{T-3}*R+(I^h_{T-3}-FB^{h*}R)-(C^{WS}_{T-2}-Y^{WS}_{T-2})-p^W_{T-2}*I^{WS}_{T-2}]*R-(C^{WS}_{T-1}-Y^{WS}T-1)-p^W_{T-1}*I^{WS}_{T-1}$

Substitute (3d) into (3c):

(3c') $I^{WS}_{T-1}=\{[PVC^k_T-PVY^k_T]+[FB^{W*}R-HEQ_{T-2}*R]\}/(1-R*p^W_{T-1})-\{[A_{T-3}*R+(I^h_{T-3}-FB^{h*}R)-(C^{WS}_{T-2}-Y^{WS}_{T-2})-p^W_{T-2}*I^{WS}_{T-2}]*R-(C^{WS}_{T-1}-Y^{WS}_{T-1})\}[R/(1-R*p^W_{T-1})]$

Side condition for primary insurance purchase by husband at the end of period t-3:

(3e) $I^h_{T-3}=(PVC^{WS}_{T-2}-PVY^{WS}_{T-2})+FB^{H*}R+p^W_{T-2}*I^{WS}_{T-2}+[p^W_{T-1}*I^{WS}_{T-1}]/R-A_{T-3}*R$

Substitute (3a') and (3c') into (3e) and manipulate get:

(3e') $I^h_{T-3}=FB^{h*}R+\{(C^{WS}_{T-2}-Y^{WS}_{T-2})+[(PVC^K_{T-1}-PVY^K_{T-1})+(FB^{W*}R-HEQ_{T-2}*R)]*p^W_{T-2}\}+\{(C^{WS}_{T-1}-Y^{WS}_{T-1})+[(PVC^K_T-PVY^K_T)+(FB^{W*}R-HEQ_{T-1}*R)]*p^W_{T-1}\}*[(1-R*p^W_{T-2})/R]+\{(PVC^{WS}_T-PVY^{WS}_{TI})*[(1-R*p^W_{T-1})/R]*[(1-R*p^W_{T-2})/R]\}-A_{T-3}*R$

[The next step makes computations easy] Solve (2c') for $[I^h_{T-2}-FB^{h*}R+A_{T-2}*R]$ and substitute for the expression remaining on the right hand side into (3e') to get:

(3e") $I^h_{T-3}=FB^{h*}R+\{(C^{WS}_{T-2}-Y^{WS}_{T-2})+[(PVC^K_{T-1}-PVY^K_{T-1})+(FB^{W*}R-HEQ_{T-2}*R)]*p^W_{T-2}\}+\{[I^h_{T-2}-FB^{h*}R+A_{T-2}*R]*(1-R*p^W_{T-2})/R\}-A_{T-3}*R$

Use (3e") to substitute into (3a') and (3c') to get:

(3a") $I^{WS}_{T-2}=[PVC^k_{T-1}-PVY^k_{T-1}]+[FB^{W*}R-HEQ_{T-2}*R]-[I^h_{T-2}-FB^{h*}R+A_{T-2}*R]$ (3C") $I^{WS}_{T-1}=[PWV^k_T-PVY^k_T]+[FB^{W*}R-HEQ_{T-1}*R]-[I^h_{T-1}-FB^{h*}R+A_{T-1}*R]$

Algorithm for $I^h_{T-3}$, $I^{WS}_{T-2}$, and $I^{WS}_{T-1}$ (A) Use (3e"), (3a") and (3c") to get initial values: $I^h_{T-3}{}^1$, $I^{WS}_{T-2}{}^1$, and $I^{WS}_{T-1}{}^1$ (B) Let $\hat{I}^h_{T-3}{}^1=I^h_{T-3}{}^1$, $\hat{I}^{WS}_{T-2}{}^1 I^{WS}_{T-2}{}^1$, and $\hat{I}^{WS}_{T-1}{}^1=I^{WS}_{T-1}{}^1$ (C) If $\hat{I}^h_{T-3}{}^1<0$ set $\hat{I}^h_{T-3}{}^1=0$ (D) Use $\hat{I}^h_{T-3}{}^1$ in (3a') to compute a new value: $\hat{I}^{WS}_{T-2}{}^2$ (E) Use $\hat{I}^h_{T-3}{}^1$ and $\hat{I}^{WS}_{T-2}{}^2$ in (3c') to compute a new value: $\hat{I}^{WS}_{T-1}{}^2$ (F) If $\hat{I}^{WS}_{T-2}{}^2<0$, set $\hat{I}^{WS}_{T-2}{}^2=0$, and if $\hat{I}^{WS}_{T-1}{}^2<0$, set $\hat{I}^{WS}_{T-1}{}^2=0$ (G) Use $\hat{I}^{WS}_{T-2}{}^2$ and $\hat{I}^{WS}_{T-1}{}^2$ in (3e) to compute a new value: $\hat{I}^h_{T-3}{}^2$ (H) For a tolerance $\epsilon>0$, if $Abs[\hat{I}^h_{T-3}{}^1-\hat{I}^h_{T-3}{}^2]<\epsilon$ and $Abs[\hat{I}^{WS}_{T-2}{}^1-\hat{I}^{WS}_{T-2}{}^2]<\epsilon$ and $Abs[\hat{I}^{WS}_{T-1}{}^1-\hat{I}^{WS}_{T-1}{}^2]<\epsilon$ then stop.

(I) If (H) is not satisfied, Set $\hat{I}^h_{T-3}{}^1=\hat{I}^h_{T-3}{}^2$, $\hat{I}^{WS}_{T-2}{}^1=\hat{I}^{WS}_{T-2}{}^2$ and $\hat{I}^{WS}_{T-1}{}^1=\hat{I}^{WS}_{T-1}{}^2$ (J) Return to Step (C).

Calculation for the period T-3

. . .(similar to T-2). . .

. . . etc.

Description of SOCSIM

SOCSIM is a highly detailed OASI benefit calculator developed by Economic Security Planning, Inc. for use in its financial planning software program—ESPlanner. SOCSIM calculates retirement, spousal, widow(er), mother, father, children, and divorcee benefits as well as OASI taxes. It does so taking into account Social Security's earnings test, family benefit maxima, actuarial reductions and increases, benefit recomputation, eligibility rules, the ceiling on taxable earnings, and legislated changes in normal retirement ages.

Calculation of OASI benefits, the basics of which are described below, is extremely complex. The Social Security Handbook describing the rules governing these benefits runs over 500 pages. Even so, on many key points, the Handbook is incomplete and misleading. This assessment is shared by Social Security's senior actuaries who were consulted repeatedly in preparing SOCSIM. Their assistance, which proved invaluable, came in the form of both extensive discussions and the transmittal of numerous, highly detailed benefit calculations run on Social Security's own benefit calculator. Were the code for this calculator itself publicly available, we would have attempted to use it directly in this study. Unfortunately, this is not the case. Moreover, as we understand it, the code is very poorly documented. Unfortunately, ANYPIA only estimates PIAs and only those PIAs that determine retirement benefits. It does not calculate dependent or survivor benefits nor does it subject such benefits to the earnings test, family maxima, actuarial reductions and increases, and recomputations for additional credited earnings. Consequently, ANYPIA did not provide an alternative to developing SOCSIM, although we have used it, where possible, to check SOCSIM's accuracy.

Retirement Benefits

Eligibility—Individuals must be fully insured to receive retirement benefits based on their earnings records. Becoming fully insured requires sufficient contributions at a job (including self-employment) covered by Social Security. For those born after 1929, acquiring 40 credits prior to retirement suffices for fully-insured status. Earnings between 1937 and 1951 are aggregated and divided by $400, and the result (rounded down to an integer number) are the pre-1952 credits which are added to the credits earned after 1950 in determining insured status. After 1951, workers earn one credit for each quarter of the year they work in Social Security-covered employment and earn above a specified minimum amount. The year of first eligibility for retirement benefits is the year in which the individual becomes age 62. The individual is entitled to retirement benefits after an application for benefits is submitted, but never before age 62.

Determination of Primary Insurance Amount (PIA)—The PIA is the basis for all benefit payments made on a worker's earnings record. There are several steps in computing the PIA. Base years are computed as the years after 1950 up to the first month of entitlement to retirement benefits begins. For survivor benefits, base years include the year of the worker's death.

Elapsed Years are computed as those years after 1950 (or after attainment of age 21, whichever occurs later) up to (but not including) the year of first eligibility. The maximum number of elapsed years for an earnings record is 40 (it could be shorter, for purposes of calculating survivor benefits if the person dies prior to age 62).

Computation Years are calculated as the number of elapsed years less five or 2, whichever is greater. Earnings in base years (up to the maximum taxable limit in each year, and through age 60 or two years prior to death, whichever occurs earlier) are wage-indexed according to economy-wide average wages. Of these, the highest earnings in years equaling the number of computation years are added together and the sum is divided by the number of months in computation years to yield Average Indexed Monthly Earnings (AIME).

Bend Points—The AIME is converted into a PIA using a formula with bend points. The bend point formula is specified as 90 percent of the first X dollars of AIME plus 32 percent of the next Y dollars of AIME plus 15 percent of the AIME in excess of Y dollars. The dollar amounts X and Y are also wage indexed and are different for different eligibility years. The dollar amounts pertaining to the year of attaining age 60 (or, for survivor benefits, the second year before death, whichever is earlier) are applied in computing the PIA.

Benefits—A person who begins to collect benefits at his or her "normal retirement age" (currently age 65) receives the PIA as the monthly retirement benefit. In subsequent years, the monthly benefit is adjusted according to the Consumer Price Index (CPI) to maintain its purchasing power.

Increases in Normal Retirement Ages—After 2003 normal retirement ages are scheduled to increase by 2 months for every year that a person's 65th birthday occurs later than the year 2003. This progressive increase in the normal retirement age for those born later ceases between the years 2008 through 2020; those attaining age 65 in these years have a normal retirement age of 66. The postponement in retirement ages resumes after 2020 such that those born after 2025 have a normal retirement age of 67. All cohorts attaining age 65 after that year have a normal retirement age of 67.

Reductions for Age—A person who begins to collect retirement benefits earlier than the normal retirement age receives a reduction for age. The reduction factor is 5/9 of 1 percent for each month of entitlement prior to the normal retirement age. The reduced benefit payment (except for the inflation adjustment) continues even after the person reaches or surpasses the normal retirement age. If the number of months of reduction exceeds 36 months (for example, in case of entitlement at age 62 when the normal retirement age is 67), then the reduction factor is 5/12 of 1 percent for every additional month of early entitlement.

Delayed Retirement Credits—Those who begin to collect benefits after their normal retirement age (up to age 70) receive delayed retirement credits. The amount of the delayed retirement credit for each month of delayed entitlement depends on the year in which a person attains normal retirement age. For example, those attaining age 65 in 1997 receive an additional 5 percent in monthly benefits for each year of delay in entitlement. However, those attaining age 65 in the year 2008 will receive an additional 8 percent in benefits for each year of delayed entitlement.

Earnings Test—If a person continues to work and earn after the month of entitlement, benefits are reduced because of an earnings test. Beneficiaries under the normal retirement age, lose $1 for each $2 earned above an earnings limit. Those older than the normal retirement age, lose $1 for each $3 earned above a higher earnings limit. The earnings limits have already been specified through the year 2000 and are scheduled to grow with average wages in subsequent years. All benefits payable on a worker's earnings record, including the worker's own retirement benefits and spousal and child dependent benefits, are proportionally reduced by the testing of the worker's earnings.

Recomputation of Benefits—Earnings in any year after entitlement to benefits are automatically taken into account in a recomputation of the PIA for determining the subsequent year's benefit amount. However, these earnings are not indexed before they are included in the AIME calculation. If such earnings are higher than some prior year's earnings (indexed earnings through age 60 or unindexed earnings after age 60), they result in an increase in the PIA and benefit payable. If they are lower than all previous year's earnings, they will not lower the PIA or benefits since only the highest earnings in base years are included in the calculations.

Spousal and Child Dependent Benefits

Eligibility—Wives and husbands of insured workers (including divorced spouses) are entitled to spousal benefits if the couple was married for at least 10 years at the time of application for spousal benefits, the spouse is over age 62. or has in care a child under age 16 entitled to benefits under the insured worker's record, and the insured worker is collecting retirement benefits. Children of insured workers under age 16 are entitled to child dependent benefits if the child is unmarried and the worker is collecting retirement benefits.

Benefits—Spousal and child benefits equal 50 percent of the insured worker's PIA (each). Child dependent benefits may be lower only if the family maximum applies. Spousal benefits may be lower due to the family maximum, a reduction for age, the application of the earnings test, or the spouse's receipt of retirement benefits based or her or his own earnings record.

Family Maximum—All benefits paid under a worker's record (except retirement benefits or divorced spousal benefits) are reduced proportionately to bring them within the family maximum benefit level. The maximum benefits payable on a worker's earnings record is determined by applying a bend point formula to the PIA similar to that applied to the AIME in calculating the PIA. For example, the family maximum equals 150 percent of the first $X of PIA plus 272 percent of the next $Y of the PIA plus 134 percent of the next $Z of the PIA plus 175 percent of the PIA greater than $X+$Y+$Z. The values X, Y, and Z are adjusted for each year of the calculation according to the growth in economy-wide average wages. In case the spousal benefit is eliminated for any reason, the benefits payable on the insured worker's record are subjected to the family maximum test again, treating the spouse as though he/she were not eligible for spousal benefits. This may result in higher benefits for children who may be eligible for dependent benefits under the worker's record.

Reduction of Spousal Benefits for Age—Spouses eligible for the spousal benefit may elect to receive (may become entitled for) their benefits before normal retirement age. In this case the spousal benefit is reduced by 25/36 of 1 percent for each month of entitlement prior to normal retirement age. If the number of months of reduction exceeds 36 months (for example, in case of entitlement at age 62 when the normal retirement age is 67), then the reduction factor is 5/12 of 1 percent for every additional month of early entitlement.

Earnings Testing of Spousal Benefits—If a spouse is earning above the amount allowed by the earnings test, the spousal benefits he or she is eligible to receive will be earnings tested according to the pre- and post-normal retirement schedule described above.

Redefinition of Spousal Benefits—If a spouse is already collecting retirement benefits, the spousal benefit is redefined as the greater of the excess of the spousal benefit over the spouse's own retirement benefit or zero.

Survivor Benefits (Widow(er), Father/Mother, and Children)

Eligibility—The surviving spouse of a deceased worker is eligible for widow(er) benefits if the widow(er) is at least age 60, is entitled (has applied for widow[er] benefits), the worker died fully insured, and the widow(er) was married to the deceased worker for at least 9 months. The widow(er) of a deceased worker is eligible for father/mother benefits if the widow(er) is entitled to benefits (has applied), the worker died fully insured, the widower has in care a child of the worker. A surviving child is eligible for child survivor benefits on the deceased worker's record if the child is under age 18 and is entitled (an application has been filed) and the worker was fully insured.

Survivor Benefits—Monthly benefits equal 100 percent of the worker's PIA for a widow(er); they equal 75 percent of the PIA for father/mother and child survivor benefits. Widow(er) and child survivor benefits may be lower only if the family maximum applies. Widow(er)s may become entitled to (elect to receive) survivor benefits earlier than normal retirement age, but not earlier than age 60. In this case the reduction is 19/40 of 1 percent-for each month of entitlement prior to normal retirement age. After the widow (er) is 62, he or she is may become entitled to (elect to receive) retirement benefits based on her own past covered earnings record. In this case the widow(er) benefits are redefined as the excess over own retirement benefit or zero, whichever is greater. Finally; widow(er) survivor and own retirement benefits are also subject to the earnings test. If the deceased worker was already collecting a reduced retirement insurance benefit, the widow(er)'s benefit cannot be greater than the reduced widow(er) benefit or the greater of 82.5 percent of the worker's PIA or the worker's own retirement benefit. If the deceased worker was already collecting a retirement insurance benefit greater than the PIA because of delayed retirement, the widow(er) or is granted the full dollar amount of the delayed retirement credit over and above the (reduced) widow(er) benefit. Father/mother benefits are not similarly augmented by delayed retirement credits that the deceased worker may have been receiving.

Father/Mother Benefits—These benefits may be reduced if the family maximum applies or if the father or mother is entitled to the own retirement benefit. In this case the father/mother benefit is redefined as the excess over the father or mother's own retirement benefit or zero, whichever is greater. Father/mother benefits are also subject to the earnings test. On the other hand, they are not reduced for age. For those eligible to receive both widow(er) and father/ mother benefits, the program calculates both and takes the larger benefit.

Calculation of a Deceased Worker's PIA—The calculation of survivor benefits in the case of a widow(er) benefits uses the larger of two alternative calculation's of the deceased worker's PIA. These are the "wage indexing" method and the "re-indexing" method. Moreover, the year up to which the worker's wages are indexed may be different depending upon whether the deceased worker would have become age 62 before or after the widow(er) attains age 60.

The Wage Indexing Method—The last year for indexing earnings is the earlier of a) the year the worker dies minus 2years or b) the year worker would have attained age 60. Bend point formula dollar amounts are taken from the earlier of the year the worker dies or the year the worker would have attained age 62. The PIA thus calculated is inflated by the CPI up to the year. The widow(er) turns age 60 (if later) to obtain the PIA value on which widower benefits would be based. Where applicable, these benefits are then adjusted for the family maximum, reduction for age, delayed retirement credits, and the earnings test.

The Reindexing Method—The worker's original earnings are indexed up to the earlier of the year the widow(er) attains age 58 or b), the year the worker attains age 60. The elapsed years are computed as the number of years from 1951 (or the worker's age 22 if later) through the year the widow(er) attains age 60. The computation years equal elapsed years minus 5 years (computation years cannot be less than 2). Bend point formula dollar values are applied from the year the widow(er) attains age 60. There is no subsequent indexing of the PIA for inflation.

The Sequencing of Widow(er) Benefit Calculations—Widow(er) benefit reductions proceed in a particular sequence: First the widow(er) plus children's benefits are subjected to the family maximum. Second, the widow(er) benefit is reduced for early entitlement (of the widow(er) prior to normal retirement age). Third, the widow(er) benefit is compared to the widow(er) own retirement benefit if entitled to the latter. Fourth, the widow(er) benefit is redefined as the excess over own benefit if own benefit is positive. Finally the earning's test is applied, first to the widow(er)'s own benefit and then to the widow(er) benefit that is in excess of own benefit. If the widow(er) benefit is eliminated as a result of these tests, the benefits payable on the insured worker's record are subjected to the family maximum test again, treating the widow(er) as though he/she were not eligible for the widow(er) benefit. This procedure can potentially increase children's benefits if the family maximum limit was binding the first time through.

Illustrating the Calculations

Table 2 illustrates SOCSIM's benefit calculations for one of the more than ten thousand CORSIM-generated observations considered in this study. The observation is that of a male born in 1945 (who is age 18 in 1963), who became married, and died at age 75. The woman he married was also born in 1945, but died at age 88. Both spouses' earnings from age 18 on are detailed on the first two pages of the table in columns four and five. These dollar amounts as well as all others in the table are adjusted for inflation; specifically, they are expressed in 1997 dollars.

The husband begins work at age 19 and retires at age 65. His earnings show a smooth growth, with earnings at the end of his workspan roughly double their value at the beginning. His wife, on the other hand, earns nothing until age 26 and then works in three sporadic intervals, making relatively little in the workforce. The sixth, seventh, and eighth columns of pages 1–3 of Table 2 show the net Social Security benefits received by the husband and wife at different ages as well as their children. The wife starts receiving benefits at age 62, whereas the husband starts receiving benefits at age 65. In this particular case, the children receive no benefits because a) their parents die late in life and b) they are too old to receive dependant benefits when their parents begin collecting retirement benefits.

Other columns on these and subsequent pages show the breakdown of the husband's, wife's, and children's benefits into various components. Columns nine through fourteen on pages 1–3 show the husband's retirement benefit, the dependant benefit he receives on his wife's earnings record, the reduction in his benefits arising from the application of the earnings test to his earnings, the reduction in his dependant benefit arising from the application of the earnings test to his wife's earnings, the dependant benefits received by children on the husband's earnings record, and the amount by which their children benefits are reduced because of the application of the earnings test to the husband's earnings. Turn next to pages 4–6 of Table 2. The fourth column shows the widower benefits to which the husband is eligible (in this case zero because the husband predeceases the wife). The next three columns show how much the children will collect as child survivors if the wife dies, the level of father's benefits (which are available to widowers with young children), and the loss of widower benefits via the application of the earnings test to the widower's earnings. The remaining columns on these and other pages of the table present corresponding benefits for the wife. To save space, Table 2 does not separately break out the impact on net benefits of family benefit maxima, actuarial reductions and increases, benefit recomputation, eligibility rules, and legislated changes in normal retirement ages. These factors are, however, fully incorporated directly into the benefit amounts reported in Table 2.

As mentioned, the husband first begins receiving benefits in 2010 at age 65. In that and subsequent years, his retirement benefit is $14,322. But since he earns $14,042 in 2010—his last year of work—his benefit is reduced by the earnings test in the amount of $2,094. His wife's benefits start in 2007 when she's age 62. Since her husband doesn't start collecting retirement benefits until 2010, her net benefit for 2007, 2008, and 2009 equals her retirement benefit which is based on her own fairly meager earnings history. The resulting benefit of $833 is less than a fifth of the $4,707 she receives starting at age 65. At this age, her own $833 retirement benefit is augmented by a $4,537 dependant benefit. But this dependant benefit is tested on the basis of her husband's earnings, producing a $663 reduction and leaving the wife with a $4,707 net benefit. A year later, when her husband is fully retired, the wife receives the full $4,537, which, together with her own retirement benefit, yields a net benefit of $5371. This net benefit continues until the wife becomes a widow at age 76. In that year, her net benefit permanently jumps to $12,705—the sum of her own $833 retirement benefit and a $11,871 widow benefit that she receives on her decedent husband's earnings record. Note that the wife's net benefit of $12,705 is less than the $14,322 her husband was receiving prior to his death. The reason is that the wife's chose to collect early retirement benefits starting at age 62. In so doing, she not only subjected her retirement benefits to a reduction for age, but also her widow benefits, once she became widowed.

Description of Child-Adult Equivalency and Economies to Scale in Shared Living Factors Child-Adult Equivalence: The software calculates the amount of life insurance that each adult member of the household needs to purchase such that, in case one of them dies, the surviving spouse and children can enjoy the same standard of living on an equivalent-adult basis as the original household. This calculation involves the conversion of children into "equivalent adults" according to the amount they are expected to consume relative to an adult. For example, a husband and wife with two children (aged 18 or less) would be equivalent to 2.8 adults if each child consumes 0.4 times as much as an adult. If one of the adult dies, the family size in equivalent adult terms becomes 1.8. If a child becomes older than age 18 and leaves the household, the equivalent-adult household size becomes 2.4, etc. Users can choose the equivalent-adult factors for children by single year of age from ages 0 through 18.

Economies of Joint Living: The program allows for "economies of joint living." For example, two people generally do not need to spend twice the amount spent by a single adult to achieve a given standard of living. This is so because many consumer goods like cars, furniture, and books can be shared by family members. For example, let z be the answer to the question "How much do two people need to spend in order to achieve the same standard of living as one person?" The answer is restricted to range of 1 through 2 (inclusive). The economies of scale function used by ESPlanner is of the following form: $C(n)=n^x$ where n is the number of equivalent adults in the family and x equals $\ln(z)/\ln(2)$. Then, if z=1.6, the four-member family described above would have to spend $2.01 to achieve the same standard of living as an adult who spends $1. (The calculation involves $x=\ln(1.6)/\ln(2)=0.678071905$ and $2.8^x=2.01$.) Users can choose the value of z. This function covers the entire range of possible economies of joint living. For example, if the user responds to the question by specifying z=2, then there are no economies of scale because two people need to spend twice as much as one person to achieve the same standard of living. A response of z=1, implies infinite economies of scale since two people can achieve the same standard of living as one person without any increase in expenditure.

What is claimed is:

1. A system for generating information representative of survivor data including information representative of annual savings, consumption and term life insurance premiums for an optimized sustainable standard of living, said system comprising:

a general purpose computing device including a processing means for processing data and memory means for storing data;

input means for inputting and storing in said memory means user data including data representative of demographic information, financial information, housing requirement information or economic assumption information;

initialization means for generating and storing in said memory means data representative of initial consumption information and initial insurance information;

means for determining and storing in said memory means data representative of projected means for determining and storing in said memory means data representative of projected housing expenditures as a function of said user data;

means for determining and storing in said memory means data representative of income from employer pension plans as a function of said user data;

means for determining and storing in said memory means data representative of social security benefits as a function of said user data;

means for determining and storing in said memory means data representative of tax liabilities as a function of said user data and said data representative of housing expenditures;

means for determining and storing in said memory means data representative of consumption and savings recommendations as a function of said user data and data representative of income from employer pension plans;

means for determining and storing in said memory means data representative of life insurance recommendations as a function of said user data;

means for optimizing, using dynamic programming including two interactive dynamic programs, and storing in said memory means, survivor data for optimized sustainable standard of living as a function of at least one of said data representative of tax liabilities, data representative of consumption and savings recommendations and data representative of life insurance recommendations, said survivor data including data representative of recommended current consumption and term life insurance requirement information, data representative of recommended annual consumption and term life insurance requirement information, data representative of non-tax deferred asset balance information, data representative of total income information, data representative of spending information, data representative of non-asset income information, data representative of tax liability information, data representative of housing expenditure information, data representative tax deferred asset balance information, data representative of estate balance information, and data representative of survivor living standards information; and means for generating formatted reports including said data representative of said survivor data.

2. A system for generating information representative of survivor data according to claim 1 further comprising:

means for determining and storing in said memory means, in successive iterations, said data representative of tax liabilities, said data representative of consumption and savings recommendations and said data representative of insurance recommendations.

3. A system for generating information representative of survivor data according to claim 1 wherein:

said data representative of demographic information includes data representative of dates of birth of at least one user, a number of children and years of birth of each child, maximum life span of at least one user, child-adult equivalency, and economies derived from joint living.

4. A system for generating information representative of survivor data according to claim 1 wherein:

said data representative of financial information includes data representative of financial data includes data representative of assets in non-tax deferred accounts, assets in and contributions to tax deferred accounts, projected earnings from wages and salaries, actual or projected years of retirement, pension plan provisions, social security earnings, actual or projected dates said social security earnings begin, current social security earnings, term value of life insurance, funeral plans, desired bequests, anticipated special expenditures, anticipated special receipts, maximum allowable indebtedness and standard of living requirements.

5. A system for generating information representative of survivor data according to claim 1 wherein:

said data representative of economic assumption information includes data representative of expected rate of inflation, expected rate of return on non-tax deferred assets and expected rate of return on tax deferred assets.

6. A method of generating information representative of annual savings, consumption and term life insurance premiums for an optimized sustainable standard of living, said method comprising the steps of:

A) providing a general purpose computing device including a processing data and memory means for storing data;

B) inputting and storing in said memory means user data including data representative of demographic information, financial information, housing requirement information or economic assumption information;

C) generating and storing in said memory means data representative of initial consumption information and initial insurance information;

D) determining and storing in said memory means data representative of projected housing expenditures as a function of said user data;

E) determining and storing in said memory means data representative of income from employer pension plans as a function of said user data;

F) determining and storing in said memory means data representative of social security benefits as a function of said user data;

G) determining and storing in said memory means data representative of tax liabilities as a function of said user data and said data representative of housing expenditures;

H) determining and storing in said memory means data representative of consumption and savings recommendations as a function of said user data and data representative of income from employer pension plans;

I) determining and storing in said memory means data representative of life insurance recommendations as a function of said user data;

J) optimizing, using dynamic programming including two interactive dynamic programs, and storing in said memory means, survivor data for optimized sustainable standard of living as a function of at least one of said data representative of tax liabilities, data representative of consumption and savings recommendations and data representative of life insurance recommendations, said survivor data including data representative of recommended current consumption and term life insurance requirement information, data representative of recommended annual consumption and term life insurance requirement information, data representative of non-tax deferred asset balance information, data representative of total income information, data representative of spending information, data representative of tax liability information, data representative of housing expenditure information, data representative of survivor living standards information; and K) generating formatted reports including said data representative of said survivor data.

7. A method for generating information representative of survivor data according to claim 6 wherein:

steps G, H and I are repeated in successive iterations until at least one of said survivor data has converged.

8. A method for generating information representative of survivor data according to claim 6 wherein:

said data representative of demographic information includes data representative of dates of birth of at least one user, a number of children and years of birth of each child, maximum life span of at least one user, child-adult equivalency, and economies derived from joint living.

9. A method for generating information representative of survivor data according to claim 6 wherein:

said data representative of financial information includes data representative of financial data includes data representative of assets in non-tax deferred accounts, assets in and contributions to tax deferred accounts, projected earnings from wages and salaries, actual or projected years of retirement, pension plan provisions, social security earning, actual or projected dates said social security earnings begin, current social security earnings, term value of life insurance, funeral plans, desired bequests, anticipated special expenditures, anticipated special receipts, maximum allowable indebtedness and standard of living requirements.

10. A method for generating information representative of survivor data according to claim 6 wherein:

said data representative of economic assumption information includes data representative of expected rate of inflation, expected rate of return on non-tax deferred assets and expected rate of return on tax deferred assets.

11. A computer implemented method for determining a planned per equivalent adult consumption expense profile $CE_P(t)$ for a household including n members, where n is an integer that may vary over time, comprising the steps of:

A. defining a desired per equivalent adult consumption expense profile for said household $CE_D(t)$, B. defining a borrowing limitation profile $B_{max}(t)$, C. defining a non-asset income profile $I(t)$, D. defining a nonconsumption expenditure profile $E(t)$, E. defining a tax expenditure profile $T(t)$, F. defining a life insurance premium expenditure profile $LI_p(t)$, G. defining a life insurance benefit profile $LI_B(t)$, H. defining an asset income profile $A(t)$, and I. employing dynamic programming, including two interactive dynamic programs, to iteratively process $CE_D(t)$, $B_{max}(t)$, $II(t)$, $E(t)$, $T(t)$, $LI_P(t)$, $LI_B(t)$, and $A(t)$, whereby $CE_P(t)$ corresponds to the highest sustainable living standard until t=T, wherein $CE_P(t) = 0$ thereafter.

12. The computer implemented method according to claim 11 which said dynamic programming effects Gauss-Seidel iterations.

13. The computer implemented method according to claim 11 wherein A(t) is equal to T zero after time T.

14. The computer implemented method of claim 11 comprising the further step of determining a desired life insurance benefit profile $LI_{BP}(t)$ for each of m of said household members, where m is less than n, by processing $CE_D(t)$, $B_{max}(t)$, $I(t)$, $E(t)$, $T(t)$, $LI_P(t)$, $LI_p(t)$, and $A(t)$ whereby upon death of one or more of said n household members, $LI_{BD}(t)$ provides value to the others of said household members whereby said $CE_P(t)$ is maximized for then-living household members after said death.

15. The computer implemented method of claim 11 wherein said non-consumption expense profile $E(t)$ is a composite of one or more of a housing expense profile $H(t)$, and initial asset profile $IA(t)$, and on inflation profile $INF(t)$.

16. System for determining a planned per equivalent adult consumption expense profile $CE_p(t)$ for a household including n members, where n is an integer that may vary over time, comprising:

A. means for defining a desired per equivalent adult consumption expense profile for said household $CE_D(t)$, B. means for defining a borrowing limitation profile $B_{max}(t)$, C. means for defining a non-asset income profile $I(t)$, D. means for defining a non-consumption expenditure profile $E(t)$, E. means for defining a tax expenditure profile $T(t)$, F. means for defining a life insurance premium expenditure profile $LI_p(t)$, G. means for defining a life insurance benefit profile $LI_B(t)$, H. means for defining an asset income profile $A(t)$, and I. means for employing dynamic programming including two interactive dynamic programs for iteratively processing $CE_D(t)$, $B_{max}(t)$, $I(t)$, $E(t)$, $T(t)$, $LI_P(t)$, $LI_B(t)$, and $A(t)$, to determine $CE_P(t)$ whereby $CE_P(t)$ corresponds to the highest sustainable living standard until t=T, wherein $CE_P(t)=0$ thereafter.

17. The system according to claim 16 wherein said dynamic programming means effects Gauss-Seidel iterations.

18. The system according to claim 16 wherein A(t) is equal to T zero after it time T.

19. The system of claim 16 further means for determining a desired life insurance benefit profile $LI_{BP}(t)$ for each of m of said household members, where m is less than n, by processing $CE_D(t)$, $B_{max}(t)$, $I(t)$, $E(t)$, $T(t)$, $LI_P(t)$, $LI_p(t)$, and $A(t)$ whereby upon death of one or more of said n household members, $LI_{BD}(t)$ provides value to the others of said household members whereby said $CE_P(t)$ is maximized for then-living household members after said death.

20. The system of claim 16 wherein said non-consumption expense profile $E(t)$ is a composite of one or more of a housing expense profile $H(t)$, and initial asset profile $IA(t)$, and on inflation profile $INF(t)$.

* * * * *